United States Patent [19]

Brode et al.

[11] 4,285,861

[45] Aug. 25, 1981

[54] SULFONATED NAPTHO[1,2]TRIAZOLE AZO BARBITURIC ACID DERIVATIVES

[75] Inventors: David A. Brode, Birdsboro; Howard L. Smith, Douglassville, both of Pa.

[73] Assignee: Crompton & Knowles Corporation, New York, N.Y.

[21] Appl. No.: 67,324

[22] Filed: Aug. 17, 1979

[51] Int. Cl.³ .................. C09B 29/036; C09B 29/52; D21D 3/00; D21H 3/80
[52] U.S. Cl. .................................. 260/154; 162/162
[58] Field of Search ............................ 260/154, 157

[56] References Cited

U.S. PATENT DOCUMENTS

| 2,192,197 | 2/1940 | Ebel et al. | 260/154 X |
|---|---|---|---|
| 3,578,653 | 5/1971 | Wallace | 260/157 |
| 3,726,851 | 4/1973 | Litke | 260/154 |
| 3,862,116 | 1/1975 | Toji | 260/154 |
| 3,963,693 | 6/1976 | Mory | 260/154 |
| 4,071,312 | 1/1978 | Blackwell | 260/154 X |

Primary Examiner—Floyd D. Higel

Attorney, Agent, or Firm—William H. Elliott, Jr.

[57] ABSTRACT

This invention relates to new compounds having the structure:

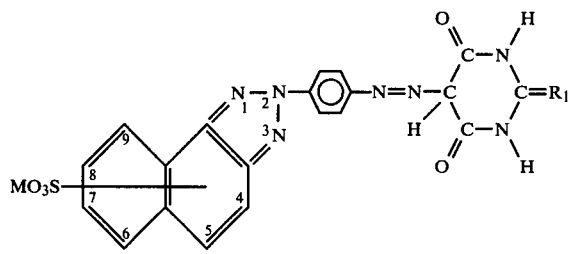

wherein M is H, Na, K, Li, N(R)$_3$H and R is H, lower alkyl or lower hydroxy alkyl and R$_1$ is oxygen, sulfur, imino, lower alkylimino, cyanoimino and carbamoylimino moieties. The new compounds are useful as fluorescent greenish-yellow dyes for paper.

5 Claims, No Drawings

SULFONATED NAPTHO[1,2]TRIAZOLE AZO BARBITURIC ACID DERIVATIVES

This invention relates to a new group of triazole compounds that are useful as fluorescent greenish-yellow dyes for paper.

The new compounds have Structure I:

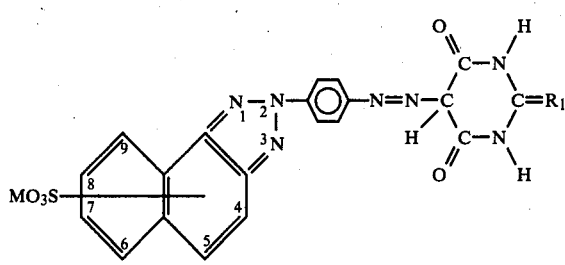

where M is H, Na, K, Li, $N(R)_3H$ and R is H, lower alkyl or lower hydroxy alkyl and $R_1$ is oxygen, sulfur, imino, lower alkylimino, cyanoimino and carbamoylimino moieties.

The new compounds may be made by diazotizing a 2-(4- aminophenyl)-2H-naphtho[1,2-d]triazole sulfonic acid and coupling the resulting diazonium salt to a barbituric acid.

Aminophenylnaphthotriazole sulfonic acids for use as diazo components in accordance with this invention may be made by known methods, as for example by diazotizing p-nitroaniline; coupling to a napthylamine sulfonic acid that will couple ortho to the amine group and form triazole by oxidation; oxidizing the amino azo compound to the nitrotriazole and reducing the nitro group to the amine; (See for example U.S. Pat. No. 2,795,577).

Napthylamine sulfonic acids that will couple ortho to the amine group and form triazoles by reduction include: 1-napthylamine-4-sulfonic acid; 2-napthylamine-7-sulfonic acid; 2-naphthylamine-6-sulfonic acid; 2-napthylamine-5-sulfonic acid; and 2-naphthylamine-8-sulfonic acid.

Suitable barbituric acids for use in accordance with the invention include: barbituric acid; 2-thiobarbituric acid; 2-iminobarbituric acid; 2-methyliminobarbituric acid; 2-ethyliminobarbituric acid; 2-propyliminobarbituric acid; 2-butyliminobarbituric acid; 2-cyanoiminobarbituric acid and 2-carbamoyliminobarbituric acid.

The Structure I compounds can be made as the free acid or as the sodium, potassium, lithium, or $N(R)_3H$ salt; in the latter case R represents the same substitutent or different substituents selected from the following: —H, —$CH_3$, —$C_2H_5$, —$C_3H_7$, —$CH_2CH_2OH$, —$CH_2CH(OH)CH_3$ or —$CH_2CH_2OCH_2CH_2OH$ by various well known techniques. Because of their superior solubility properties, the Structure I compounds in which M is $N(C_2H_4OH)_3H$ are preferred.

The new compounds are useful as fluorescent greenish-yellow paper dyes—particularly for tissue, toweling and fine papers. As paper dyes they have excellent substantivity and tinctorial strength; they also exhibit very good properties from the standpoint of bleachability and fastness to light and bleeding. Many of the salts—particularly the triethanolamine salts—have sufficient solubility so that they can be added as concentrated dye solutions to the pulp or stock from which the paper is formed.

The following examples will illustrate the preparation and use of a preferred compound.

EXAMPLE #1

2-(4-Aminophenyl)-2H-naphtho[1,2-d]triazole-5-sulfonic acid sodium salt (36.2 parts) was dissolved in 200 parts of water at 70–90° C., stirred for 10 minutes with 0.5 part of activated charcoal and clarified with 2.0 parts of filter-aid. Seven parts of sodium nitrite were added, and the solution run into a mixture of 100 parts of water and 25 parts of 20°Be" hydrochloric acid over ½hour, while holding the temperature below 55° C. With excess nitrous acid present, the temperature was maintained at 50–55° C. for 2 hours. At the end of this period, the precipitate was filtered and thoroughly washed with water.

The diazo paste was slurried in 400 parts of water, and 12.8 parts of barbituric acid were added. The mixture was made alkaline to Brilliant Yellow paper with sodium carbonate and stirred for 12 hours. At the end of this period, the mass was filtered and the cake dried at 110° C. yielding 44 parts of yellow powder, which when applied according to Example #3 produced bright greenish-yellow hues on paper.

EXAMPLE #2

2-(Aminophenyl)-2H-naphtho[1,2-d]triazole-5-sulfonic acid sodium salt (36.2 parts) was diazotized and filtered as outlined in Example #1. The diazo paste was slurried in 100 parts of water at 40–50° C. until smooth. Barbituric acid (12.8 parts) was added, and the pH of the mixture was carefully raised to 6.6–6.8 by adding sufficient triethanolamine. The mass was stirred for 12 hours at 40–50° C. at which time water was added to increase the total weight of the solution to 295 parts, producing a deeply-colored solution which, when applied according to Example #3, produced bright greenish-yellow hues on paper.

EXAMPLE #3

To 250 parts of water at 70° F. was added 5.0 parts of Bleached Softwood Kraft paper pulp (Brightness of 88–91 photovolt, freeness of 425–450 ml CSF) and 2.0 parts of a 2.5 percent solution in water of rosin size, and mixed for five minutes with a paddle stirrer. 0.025 parts of a dye according to Example 1 (as a 0.25 percent solution in water) was added and mixed for 20 minutes. The pH of the slurry was adjusted to 4.5 with alum, mixed for 5 minutes and formed as a handsheet. The pH of the water in the sheet mould was adjusted to 4.5 with alum. The handsheet was pressed between 2 blotters at 500 psi., transferred to two clean, dry blotters, and dried on a drum dryer at a surface temperature of 210–215° F. The paper was dyed a bright fluorescent greenish-yellow.

We claim:

1. The compound having the structure:

wherein M is H, Na, K, Li, N(R)$_3$H and R is H, alkyl and lower hydroxalkyl and R$_1$ is oxygen, sulfur, imino, lower alkylimino, cyanoimino and carbamoylimino.

2. A compound according to claim 1 wherein R$_1$ is oxygen.

3. A compound according to claim 1 or 2 wherein M is Na.

4. A compound according to claim 1 or 2 wherein M is N(C$_2$H$_4$OH)$_3$H.

5. A compound according to claims 1, 2, 3 or 4 wherein the sulfonic group is in the 5 position.

* * * * *